United States Patent Office 3,300,533
Patented Jan. 24, 1967

3,300,533
METHOD FOR MAKING 1-CHLORO-2-PHENYL-3-LOWER ALKOXY-1-PROPENE
Willis C. Keith, Lansing, and Robert P. Zmitrovis, Park Forest, Ill., assignors to Sinclair Research, Inc., Wilmington, Del., a corporation of Delaware
No Drawing. Filed Nov. 20, 1961, Ser. No. 153,671
1 Claim. (Cl. 260—611)

This invention is a novel type of unsaturated aromatic hydrocarbon, 3-substituted-1-chloro-2-phenyl-1-propene, and a method for its manufacture. The substituent in the 3 position may be halogen, or a number of nitrogen and/or oxygen containing radicals.

The novel compound has the general formula:

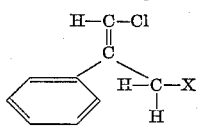

where X may be halogen, hydroxy, or oxyorgano, that is an oxygen-containing hydrocarbon radical such as acyloxy or one of numerous ether radicals. X also may be a nitrogen containing group such as amino, nitro, cyano or nitrite. The halogen is preferably of atomic number 17 to 53. When X is oxyorganic, that is, an acyloxy or alkoxy (ether) group it will usually have a substituted or unsubstituted hydrocarbon radical of 1 to 10 carbon atoms. This hydrocarbon radical may be straight or branched chain, saturated or unsaturated and preferably is lower alkyl, for example, 1–4 or more carbon atoms. The phenyl radical of the formula may also be substituted, as with one or more lower alkyl groups.

The compound of the invention is useful for a number of applications, since the allylic chloride group is extremely reactive and can be used for the preparation of the corresponding alcohol, ether, ester, etc. The compound is useful as an intermediate for the preparation of homopolymer coatings, bonding agents, etc. and copolymerizes with a number of monomers, e.g. acrylonitrile, styrene, methyl methacrylate etc., to produce plastic films or protective coatings and fibers.

1,3-dichloro-2-phenyl-1-propene may be manufactured from 1,2,3-trichloro-2-phenyl propane. This starting material may be manufactured by chlorination of isopropylbenzene, as set forth in U.S. Patent 2,430,822. It also may be obtained as a by-product in the manufacture of 2-phenyl-allyl chloride by chlorination of alpha-methyl styrene as set forth in our copending application Serial No. 145,506, filed October 14, 1961 and now Patent No. 3,100,232 and incorporated herein by reference. The 1,2,3-trichloro-2-phenyl propane reaction is generally run under a reduced partial pressure of, say, about 1 to 700 mm. Hg, preferably about 10 to 100 mm. Hg, to produce the 1,3-dichloro-2-phenyl-1-propene. Preferably, vacuum is applied to achieve the reduced pressure, but alternatively an inert gas such as nitrogen may be passed through the reaction mixture to remove HCl. The reaction also may be run in an inert solvent. The temperature of the treatment is about 100 to 300° C., preferably about 150 to 170° C. A treatment time of about 0.5 to 48 hours or more, preferably 5 to 30 hours, is usually sufficient to complete the reaction or at least to give a substantial yield of the desired product.

The 1-chloro-3-hydroxy-2-phenyl-1-propene may be made from 1,3-dichloro-2-phenyl-1-propene by base hydrolysis. Alternatively, the compound where X is an oxy material may be made from 1,2,3-trichloro-2-phenyl propane by refluxing the trichloro compound with the suitable hydrogen compound of the desired X radical containing dissolved or dispersed alkaline metal base. Such bases include the alkali and alkaline earth metal hydroxides. NaOH and KOH are preferred and the refluxing medium generally will contain about 1 to 15%, preferably about 5 to 10% of the base. For maximum yield, the refluxing medium is used in an amount sufficient to provide at least about one mole of X radical per mole of trichloride and the refluxing is continued for a time sufficient to complete the conversion or at least long enough to give a substantial yield of the desired product.

The refluxing medium, as mentioned, is the hydrogen compound of the desired X radical, that is, water in the case of hydroxyl, alcohol in the case of alkoxy, organic acid in the case of acyloxy, nitrous acid in the case of nitrite, hydrocyanic acid in the case of cyano, ammonia in the case of amino, etc.

In these refluxing reactions, pressure on the refluxing liquid mixture is often about 14 to 100 p.s.i.g., preferably about 15 to 30 p.s.i.g. The temperature and the time required for the reaction are interdependent and also vary with the type of manipulations and the reactivity of the reagents employed. For example, 5 to 48 hours, preferably about 15 to 30 hours suffice to produce a good yield of the hydroxide in a batch reaction at about 100° C. Much shorter times are required at higher temperatures and also when the contacting is performed in a flow system. The time requirement in the latter system may be very short, perhaps on the order of a second, to give a worthwhile yield. Also, the reaction to form the ether is much faster than the reaction to form the hydroxide.

The following examples of manufacture of the novel compound of this invention should be considered illustrative only and not limiting.

Example I 1,2,3-trichloro-2-phenyl-propane was heated in a flask for 24 hours at 160°±10° C. under a pressure of about 100 mm. Hg. HCl was removed as it formed. The product consisted of 1,3-dichloro-2-phenyl-1-propene having the following characteristics:

| | Found | Theory |
| --- | --- | --- |
| Boiling point, ° C. at 2 mm | 85±1 | |
| Refractive Index n 25/d | 1.5798 | |
| Percent Cl | 37.6 | 37.9 |
| Etherification number | 311 | 300 |

The etherification number is the number of milligrams of KOH required to react with a gram of the sample. The number is useful in determining allylic chloride.

Example II 1-chloro-3-ethoxy-2-phenyl-1-propene was prepared by refluxing for 16 hours at 80° C., 80 grams of 1,2,3,-trichloro-2-phenyl propane and 50 grams of KOH dissolved in 500 ml. of 90% ethyl alcohol. The product was worked up by removing ethanol on a steam bath, washing the residue with water, drying it over $CaSO_4$ and fractionating it on a helices packed column. 40 grams were obtained of ether having the following specifications:

| | Found | Theory |
| --- | --- | --- |
| Boiling Point, ° C. at 10 mm | 118±2 | |
| Refraction Index n 25/d | 1.5380 | |
| Percent C | 66.6 | 67.2 |
| Percent H | 6.5 | 6.6 |
| Percent Cl | 18.6 | 18.1 |

The ether group and the unsaturation were verified by infrared.

Example III 1-chloro-3-hydroxy-2-phenyl-1-propene was prepared by refluxing 1,2,3-tri-chloro-2-phenyl-propane with a 7% aqueous sodium hydroxide solution for 24 hours at 100° C. The product was worked up by separating the water and organic phases, washing the organic phase with water, drying it with CaSO₄, and distillation. A near quantitative yield of the alcohol was obtained, having the following characteristics:

|  | Found | Theory |
|---|---|---|
| Boiling point, °C. at 1.9 mm | 93+1 |  |
| Refractive Index n 25/d | 1.5842 |  |
| Percent C | 64.3 | 64.1 |
| Percent H | 5.3 | 5.3 |
| Percent Cl | 20.6 | 21.1 |

Infrared analysis verified the unsaturation and the hydroxyl group.

It is claimed:

A method for making 1-chloro-2-phenyl-3-lower alkoxy-1-propene which comprises refluxing a mixture of 1,2,3-trichloro-2-phenyl propane with a dilute solution of alkaline metal hydroxide in a lower alkanol.

References Cited by the Examiner

UNITED STATES PATENTS 2,072,015   2/1937   Tamele et al.
2,894,995   7/1959   Schmerling _____ 260—615

OTHER REFERENCES

Julia: Chem. Abs. vol. 46 (1952), pp. 7035–1036.
Royals: Advanced Organic Chemistry, 1954, pp. 264, 265, 516, 517.
Tiffeneau: Annales de Chemie et de Physique 8, vol. 10 (1907) pp. 167–168.
Straus et al.: Chem. Abs., vol. 8 (1914) pp. 332–333.

LEON ZITVER, *Primary Examiner.*

CHARLES B. PARKER, *Examiner.*

B. HELFIN, *Assistant Examiner.*